(12) United States Patent
Ferentz et al.

(10) Patent No.: US 8,160,753 B2
(45) Date of Patent: Apr. 17, 2012

(54) TIME INTEGRATED GUARD BAND

(75) Inventors: Alon Ferentz, Bat Yam (IL); Roni Blaut, Netanya (IL)

(73) Assignee: Microsemi Corp.—Analog Mixed Signal Group Ltd., Hod Hasharon (IL)

( * ) Notice: Subject to any disclaimer, the term of this patent is extended or adjusted under 35 U.S.C. 154(b) by 409 days.

(21) Appl. No.: 12/489,506

(22) Filed: Jun. 23, 2009

(65) Prior Publication Data

US 2010/0030392 A1 Feb. 4, 2010

Related U.S. Application Data

(60) Provisional application No. 61/085,006, filed on Jul. 31, 2008.

(51) Int. Cl.
*G06F 1/00* (2006.01)
(52) U.S. Cl. ......... 700/295; 713/300; 713/320; 713/340
(58) Field of Classification Search .................. 700/295, 700/296; 713/300, 310, 322–324, 330
See application file for complete search history.

(56) References Cited

U.S. PATENT DOCUMENTS

| | | |
|---|---|---|
| 4,467,314 A | 8/1984 | Weikel et al. |
| 4,528,667 A | 7/1985 | Fruhauf |
| 4,692,761 A | 9/1987 | Robinton |
| 4,733,389 A | 3/1988 | Puvogel |
| 4,799,211 A | 1/1989 | Felker et al. |
| 4,815,106 A | 3/1989 | Propp et al. |
| 4,885,563 A | 12/1989 | Johnson et al. |
| 4,903,006 A | 2/1990 | Boomgaard |
| 4,992,774 A | 2/1991 | McCullough |
| 5,032,833 A | 7/1991 | Laporte |
| 5,066,939 A | 11/1991 | Mansfield |
| 5,093,828 A | 3/1992 | Braun et al. |
| 5,148,144 A | 9/1992 | Sutterlin et al. |
| 5,192,231 A | 3/1993 | Dolin |
| 5,351,272 A | 9/1994 | Abraham |

(Continued)

FOREIGN PATENT DOCUMENTS

WO 9623377 8/1996

OTHER PUBLICATIONS

Lynn K "Universal Serial Bus (USB) Power Management"; WESCON/97 Conference Proceedings, Santa Clara, CA, USA, Nov. 4-6, 1997; New York, N. Y.; IEEE Nov. 4, 1997 pp. 434-441 XP010254418.

(Continued)

*Primary Examiner* — Albert Decady
*Assistant Examiner* — Douglas Lee
(74) *Attorney, Agent, or Firm* — Simon Kahn

(57) ABSTRACT

An automated method of controlling a power managed system, such as a power over Ethernet system. The method is constituted of: establishing a power consumption budget for a plurality of loads; defining an overbudget limit and an associated time window; monitoring power consumption of the plurality of loads; determining, at a plurality of time intervals over the associated time window, an indication of excess power consumption for each of the plurality of time intervals, the indication of excess power consumption being a function of the monitored power consumption and the defined power consumption budget; and in the event that an integral over the associated time window of a function of the determined indications of excess power consumption exceeds the overbudget limit, disabling at least one load from consuming power.

12 Claims, 4 Drawing Sheets

U.S. PATENT DOCUMENTS

| | | | |
|---|---|---|---|
| 5,452,344 A | 9/1995 | Larson | |
| 5,491,463 A | 2/1996 | Sargeant et al. | |
| 5,652,893 A * | 7/1997 | Ben-Meir et al. | 713/310 |
| 5,684,826 A | 11/1997 | Ratner | |
| 5,689,230 A | 11/1997 | Merwin et al. | |
| 5,799,196 A | 8/1998 | Flannery | |
| 5,828,293 A | 10/1998 | Rickard | |
| 5,835,005 A | 11/1998 | Furukawa et al. | |
| 5,859,596 A | 1/1999 | McRae | |
| 5,884,086 A | 3/1999 | Amoni et al. | |
| 5,949,974 A | 9/1999 | Ewing | |
| 5,991,885 A | 11/1999 | Chang | |
| 5,994,998 A | 11/1999 | Fisher et al. | |
| 6,033,101 A | 3/2000 | Reddick et al. | |
| 6,115,468 A | 9/2000 | DeNicolo | |
| 6,125,448 A | 9/2000 | Schwan et al. | |
| 6,140,911 A | 10/2000 | Fisher et al. | |
| 6,218,930 B1 | 4/2001 | Katzenberg et al. | |
| 6,243,818 B1 | 6/2001 | Schwan et al. | |
| 6,295,356 B1 | 9/2001 | De Nicolo | |
| 6,301,527 B1 | 10/2001 | Butland | |
| 6,329,906 B1 | 12/2001 | Fisher et al. | |
| 6,348,874 B1 | 2/2002 | Cole | |
| 6,377,874 B1 | 4/2002 | Ykema | |
| 6,393,607 B1 | 5/2002 | Hughes et al. | |
| 6,473,608 B1 | 10/2002 | Lehr et al. | |
| 6,480,510 B1 | 11/2002 | Binder | |
| 6,496,105 B2 | 12/2002 | Fisher et al. | |
| 6,643,566 B1 | 11/2003 | Lehr et al. | |
| 6,753,761 B2 | 6/2004 | Fisher et al. | |
| 7,562,234 B2 * | 7/2009 | Conroy et al. | 713/300 |
| 2003/0058085 A1 | 3/2003 | Fisher et al. | |
| 2005/0049758 A1 | 3/2005 | Lehr et al. | |
| 2008/0114998 A1 * | 5/2008 | Ferentz et al. | 713/324 |
| 2009/0276651 A1 * | 11/2009 | Conroy et al. | 713/340 |
| 2009/0300391 A1 * | 12/2009 | Jessup et al. | 713/323 |

OTHER PUBLICATIONS

Bearfield, J.M., "Control the Power Interface of USB's Voltage Gus", Electronic Design, U.S., Penton Publishing, Clev. Ohio, vol. 45, No. 15, Jul. 1997 p. 80-86.

RAD Data Comm. Ltd., "Token Ring Design Guide", 1994, #TR-20-01/94, Chapters 1 through 4-21.

PowerDsine Product Catalogue 1999, pp. 56-79 and 95-105, Israel.

Universal Serial Bus Specification—Rev 1.0, Jan. 15, 1996; Sec 4.2.1 pp. 29-30; Sec 7.2.1-7.2.1.5 pp. 131-135; Sec. 9.2.1.-9.2.5.1 pp. 170-171; Sec 9.6.2 pp. 184-185.

IEEE Standards—802.3af-2003, pp. 36-57 (sections 33.2.3.7-33.3.6.1), p. 94-96; p. 102, p. 115, published Jun. 18, 2003, New York.

* cited by examiner

TIME INTEGRATED GUARD BAND

CROSS-REFERENCE TO RELATED APPLICATION

This application claims priority to U.S. Provisional Patent Application Ser. No. 61/085,006 filed Jul. 31, 2008, entitled "Time Integrated Guard Band", the entire contents of which is incorporated herein by reference.

TECHNICAL FIELD

The present invention relates to the field of managed power systems and more particularly to a system allowing power usage in excess of an authorized power usage limit for a limited time period.

BACKGROUND

The growth of local and wide area networks based on Ethernet technology has been an important driver for cabling offices and homes with structured cabling systems having multiple twisted wire pairs. The ubiquitous local area network, and the equipment which operates thereon, has led to a situation where there is often a need to attach a network operated device for which power is to be advantageously supplied by the network over the network wiring. Supplying power over the network wiring has many advantages including, but not limited to: reduced cost of installation; centralized power and power back-up; and centralized security and management.

Several patents addressed to this issue exist including: U.S. Pat. No. 6,473,608 issued to Lehr et al., whose contents are incorporated herein by reference, and U.S. Pat. No. 6,643,566 issued to Lehr et al., whose contents are incorporated herein by reference. Furthermore, a standard addressed to the issue of powering remote devices over an Ethernet based network has been published as IEEE 802.3af—2003, whose contents are incorporated herein by reference, and is referred to hereinafter as the "af" standard. A device receiving power over the network wiring is referred to as a powered device (PD) and the powering equipment delivering power into the network wiring for use by the PD is referred to as a power sourcing equipment (PSE).

Powering units are commercially available which support a single port, or a plurality of ports. For clarity, each port of a power over Ethernet (PoE) controller serving a plurality of ports is referred to as a PSE and exhibits electrical characteristics as described in the "af" standard.

A PoE controller serving a plurality of ports is preferably provided with a power management functionality which prevents powering of ports when the total power consumption of all ports drawing power is within a predetermined range of the available overall power. In an exemplary prior art embodiment this is accomplished by providing a guard band as described in U.S. Pat. No. 7,257,724 issued Aug. 17, 2004 to Lehr et al, and entitled "METHOD AND APPARATUS FOR POWER MANAGEMENT IN A LOCAL AREA NETWORK", the entire contents of which is incorporated herein by reference. In an exemplary embodiment the guard band is equal to, or greater than, the maximum power which may be drawn by a single port, or PD, disregarding the effect of inrush current. Thus, by implementing the guard band, a PD can not be powered in a situation where powering the additional PD would bring the total utilized power to be in excess of the total available power.

The power management function of the prior art further operates to monitor the total power consumption of the system. In the event that power consumption is within the guard band limit of the total available power, no additional PDs are powered, as explained above. In the event that power consumption meets or begins to exceed the total available power, or alternatively meets or exceeds a limit set below the total available power, PDs are disabled to reduce total power consumption. Preferably, PDs are disabled while maintaining priority, thus low priority PDs are disabled first, while higher priority PDs are powered.

Each PD is connected to a unique port of a particular PoE controller, and thus disabling the port is synonymous with disabling the PD.

The above mechanism leads to a system which aggressively controls power usage to ensure that pre-set limits are never exceeded. Modern power supplies are often supplied with reserve capacity, in excess of their rated capacity, which can support excess power draw for a limited time period. The prior art system does not take into account this reserve capacity, and instead maintains an unused capacity by virtue of the guard band.

U.S. patent application Ser. No. 11/934,798 published May 15, 2008 as US 2008/0114998 A1 to Ferentz et al, entitled "REDUCED GUARD BAND FOR POWER OVER ETHERNET", the entire contents of which are incorporated herein by reference, is addressed to a method for utilizing the unused power of the guard band. However, the method first requires disabling power from at least one of the PDs, which leads to a situation where a PD may be cut off inadvertently.

There is thus a need for an improved power management scheme overcoming at least some of the above limitations.

SUMMARY

In view of the discussion provided above and other considerations, the present disclosure provides methods and apparatus to overcome some or all of the disadvantages of prior and present power management systems and methods. Other new and useful advantages of the present methods and apparatus will also be described herein and can be appreciated by those skilled in the art.

This is provided in certain embodiments by an automated method of controlling a power managed system in which a power consumption budget, an overbudget limit and an associated time window are established for a plurality of loads. The power consumption of the plurality of loads is monitored, and an indication of excess power consumption is determined at a plurality of time intervals over the associated time window. In the event that an integral over the associated time window of a function of the determined excess power consumption exceeds the overbudget limit, at least one load is disabled from consuming power.

Additional features and advantages of the invention will become apparent from the following drawings and description.

BRIEF DESCRIPTION OF THE DRAWINGS

For a better understanding of the invention and to show how the same may be carried into effect, reference will now be made, purely by way of example, to the accompanying drawings in which like numerals designate corresponding elements or sections throughout.

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the accompanying drawings.

DETAILED DESCRIPTION OF PREFERRED EMBODIMENTS

Figure 1:
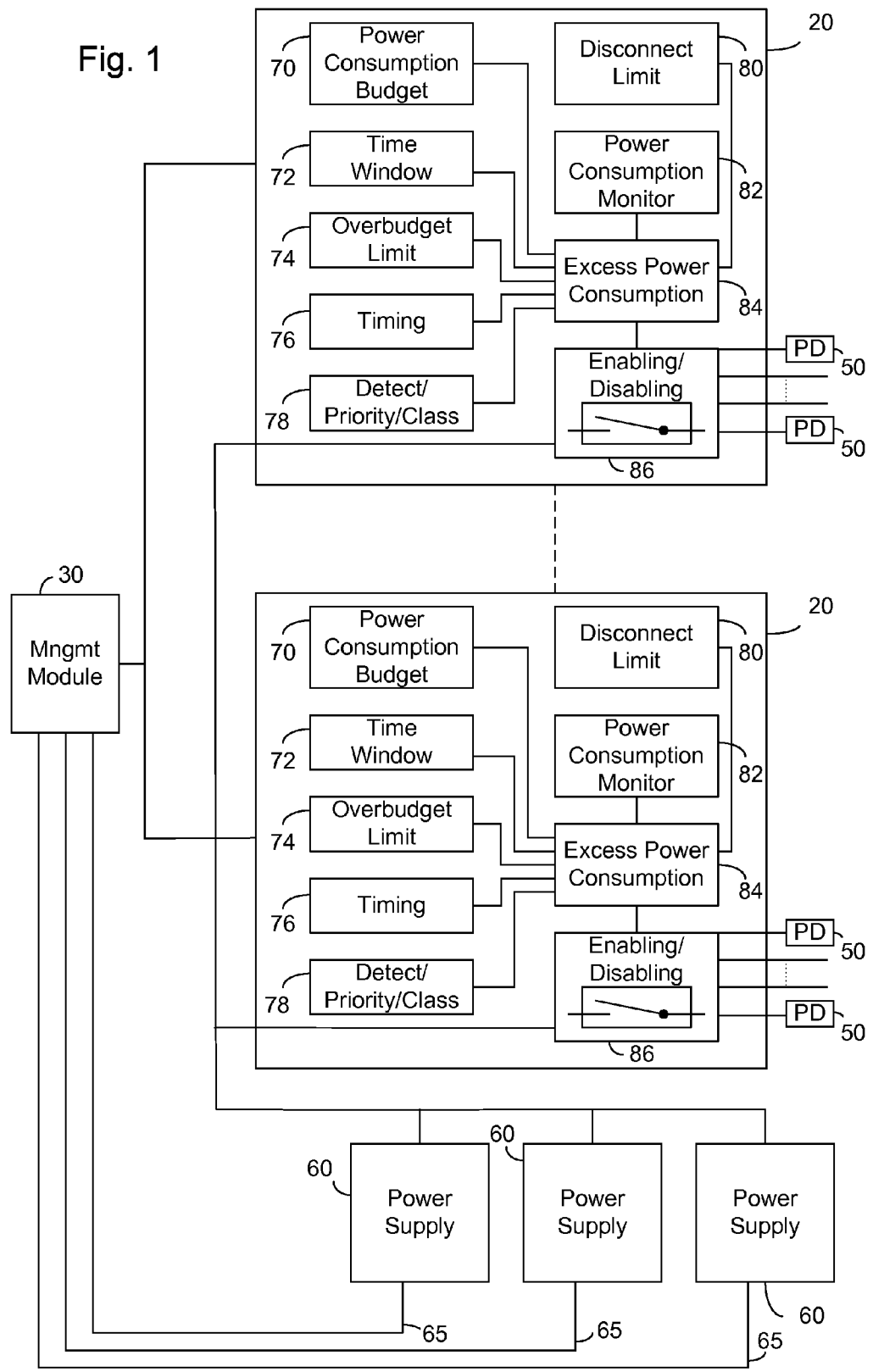
FIG. 1 is a high level schematic diagram of a power control system comprising a plurality of power controllers, each illustrated as a power over Ethernet controller providing power to a plurality of powered devices over communication cabling, the power controllers being responsive to an external management module.

The present embodiments enable an automated method of controlling a power managed system in which a power consumption budget, an overbudget limit and an associated time window are established for a plurality of loads. The power consumption of the plurality of loads is monitored, and an indication of excess power consumption is determined at a plurality of time intervals over the associated time window. In the event that an integral over the associated time window of a function of the determined excess power consumption exceeds the overbudget limit, at least one load is disabled from consuming power.

Before explaining at least one embodiment in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic diagram of a power control system 10 comprising a plurality of power controllers, each illustrated as a power over Ethernet controller 20 providing power to a plurality of powered devices 50 over communication cabling, the power controllers being responsive to an external management module 30. Power control system 10 further comprises a plurality of power supplies 60 each exhibiting a status indicator signal 65 connected to an input of management module 30. Each of the power over Ethernet controllers 20 comprises: a power consumption budget storage functionality 70; a time window storage functionality 72; an overbudget limit defining functionality 74; a timing functionality 76; a detection, classification and priority determining functionality 78; a disconnect limit defining functionality 80; a power consumption monitoring functionality 82; an excess power consumption determining functionality 84; and a power enabling/disabling functionality 86.

Each of power consumption budget storage functionality 70; time window storage functionality 72; overbudget limit defining functionality 74; timing functionality 76; detection, classification and priority determining functionality 78; disconnect limit defining functionality 80; power consumption monitoring functionality 82; and power enabling/disabling functionality 86 is in communication with excess power consumption determining functionality 84. Management module 30 is in communication with each of the power over Ethernet controllers 20, and in particular with the functionalities as required, and further receives each of status indicator signals 65 of the power supplies 60. Each of the power over Ethernet controllers 20, and in particular power enabling/disabling functionality 86 of each of the power over Ethernet controllers 20, receives power from power supplies 60 which are connected in a power bank arrangement. Management module 30 is further arranged to receive power from power supplies 60 (not shown), however the majority load to power supplies 60 is represented by the various power devices 50, which are alternately enabled to draw power from power supplies 60 or disabled from drawing power from power supplies 60 via a respective port of power enabling/disabling functionality 86. In an exemplary embodiment, power enabling/disabling functionality 86 is implemented by one or more FET switches, each associated with a particular powered device 50, and arranged to allow power flow to the associated powered device 50 or alternately not allow power flow to the associated powered device 50.

Power consumption monitoring functionality 82 is in one embodiment implemented by a plurality of sense resistors inserted in the serial current path to each powered device 50, the voltage drop across each of the sense resistors being sensed by a voltage sensor, and being indicative of the current flow to the respective powered device 50. The voltage received by each of the power over Ethernet controllers 20 is in one embodiment further measured, and in another embodiment a nominal voltage value is used. The power consumption of the plurality of powered devices 50 is thus determined by power consumption monitoring functionality 82 responsive to the voltage and current flow sensed by the respective sense resistors.

In operation, management module 30 determines the total available power responsive to each of status indicator signals 65, each of which is associated with a power supply of a predetermined capacity. Management module 30 further receives from each power over Ethernet controller 20, and in particular from power consumption monitoring functionality 82 thereof, in cooperation with detection, classification and priority determining functionality 78, the power consumption associated with the power over Ethernet controller 20. In one embodiment, the power consumption includes a predetermined additional value for the power consumption of the constituent circuitry of power over Ethernet controller 20, as power consumption monitoring functionality 82 only determines an indication of power consumption for each of the powered devices 50. In another embodiment, power consumption monitoring functionality 82 includes a determination of all power consumed associated with power over Ethernet controller 20.

Responsive to the total available power, and the received indications of power consumption, management module 30 is operative to allocate power as a power budget to each power over Ethernet controller 20, preferably maintaining priority. Power may be allocated up to the total available power. Management module 30 is further operative to receive additional power requests, with associated priority designations, responsive to each of the detection, classification and priority determining functionalities 78. In the event that additional power is available, the additional requested power is allocated to each of the power over Ethernet controllers 20 requesting power, preferably maintaining priority, and the allocation is transmitted thereto by management module 30.

Each of the power over Ethernet controllers 20 is operative to receive the transmitted power budget from management module 30, and store the received power budget in power consumption budget storage functionality 70. In one embodiment, receipt of the transmitted budget is performed by a control functionality (not shown). Each of the power over Ethernet controllers 20 is further operative to determine power consumption. In one embodiment, the determined power consumption is responsive to power consumption monitoring functionality 82, and in another embodiment, the determined power consumption is an allocated power amount responsive to detection, classification and priority determining functionality 78.

Each of the power over Ethernet controllers 20 is further operative to store a time window in time window storage functionality 72. In one embodiment the time window is transmitted from management module 30, and stored in time window storage functionality 72. In one embodiment, receipt of the transmitted time window is performed by a control functionality (not shown), which is further operative to direct the transmitted time window to time window storage functionality 72. In another embodiment the time window is pre-defined within power over Ethernet controller 20.

Overbudget limit defining functionality 74 is operative to define and store therein an overbudget limit. In one embodiment, management module 30 transmits an overbudget percentage allowed, and overbudget limit defining functionality 74 is operative to determine the overbudget power amount responsive to the received percentage and the received power budget. In another embodiment, an overbudget percentage is pre-defined within power over Ethernet controller 20, and overbudget limit defining functionality 74 is operative to determine the overbudget power amount responsive to the pre-defined overbudget percentage and the received power budget. In yet another embodiment, the overbudget amount is defined by management module 30, and transmitted to power over Ethernet controller 20 for storage in overbudget limit defining functionality 74. In one further embodiment, receipt of the transmitted overbudget amount or overbudget percentage is performed by a control functionality (not shown), which is further operative to direct the transmitted overbudget amount to overbudget limit defining functionality 74.

Timing functionality 76 is operative to generate a periodic time signal for periodic operation of excess power consumption determining functionality 84, as will be described further hereinto below.

Detection, classification and priority determining functionality 78 is operative to detect powered devices which have not been enabled via power enabling/disabling functionality 86, optionally classify the powered devices in terms of power requirements, and determine a priority for each of the powered devices associated with the power over Ethernet controller 20. In one embodiment, detection, classification and priority determining functionality 78 communicates directly with management module 30, and in another embodiment detection, classification and priority determining functionality 78 communicates with management module 30 via a control functionality (not shown).

Disconnect limit defining functionality 80 is operative to define and store therein a disconnect power limit, i.e. a power limit which is not to be exceeded and for which immediate action is to be taken. In one embodiment, management module 30 transmits a disconnect limit percentage, and disconnect limit defining functionality 80 is operative to determine the disconnect power limit responsive to the received disconnect limit percentage and the received power budget. In another embodiment, a disconnect limit percentage is pre-defined within power over Ethernet controller 20, and disconnect limit defining functionality 80 is operative to determine the disconnect power limit responsive to the pre-defined disconnect limit percentage and the received power budget. In yet another embodiment, the disconnect power limit amount is defined by management module 30, and transmitted to power over Ethernet controller 20 for storage in disconnect limit defining functionality 80. In one further embodiment, receipt of the disconnect limit percentage or disconnect power limit amount is performed by a control functionality (not shown), which is further operative to forward received disconnect limit percentage or disconnect power limit amount to disconnect limit defining functionality 80.

Power consumption monitoring functionality 82 is operative to monitor the total power consumption of attached enabled powered devices 50, as described above. In one embodiment, power consumption monitoring functionality 82 communicates directly with management module 30, and in another embodiment power consumption monitoring functionality 82 communicates with management module 30 via a control functionality (not shown).

Excess power consumption determining functionality 84 is operative to periodically, responsive to a timing output of timing functionality 76, determine an indication of excess power consumption over the associated time window of time window storage functionality 72 and integrate a function of the determined indication of excess power consumption over the associated time window. In the event that the integral of the function of the determined indication of excess power consumption exceeds the overbudget limit of overbudget limit defining functionality 74, excess power consumption determining functionality 84 is further operative via power enabling/disabling functionality 86, to disable at least one of the powered devices 50 from consuming power. In an exemplary embodiment in which power enabling/disabling functionality 86 is constituted of a plurality of FET switches, each associated with a particular powered device 50, as described above, excess power consumption determining functionality is operative to open the FET switch associated with the associated powered device 50 drawing power thereby disabling power flow to the powered device 50.

In one embodiment, the indication of excess power consumption is responsive to the power consumption budget of power consumption budget storage functionality 70 and the monitored total power consumption of power consumption monitoring functionality 82. In one embodiment the function of the determined indication of excess power consumption comprises a limitation of the values of the determined indication of excess power consumption to a predetermined range. In one further embodiment, the predetermined range is a function of the disconnect limit of disconnect limit defining functionality 80, as will be described below in relation to FIG. 3.

Excess power consumption determining functionality 84 is in one embodiment further operative at each of the periodic time intervals, responsive to timing functionality 76, to compare the current power consumption monitored by power consumption monitoring functionality 82 with the disconnect power limit of disconnect limit defining functionality 80. In the event that the current power consumption monitored by power consumption monitoring functionality 82 exceeds the disconnect power limit of disconnect limit defining functionality 80, excess power consumption determining functionality 84 is further operative via power enabling/disabling functionality 86, to disable at least one of the powered devices 50 from consuming power. In an exemplary embodiment in which power enabling/disabling functionality 86 is constituted of a plurality of FET switches, excess power consumption determining functionality is operative to open the FET switch associated with one of the powered devices 50 drawing power thereby disabling power flow to the powered device 50.

Figure 2:
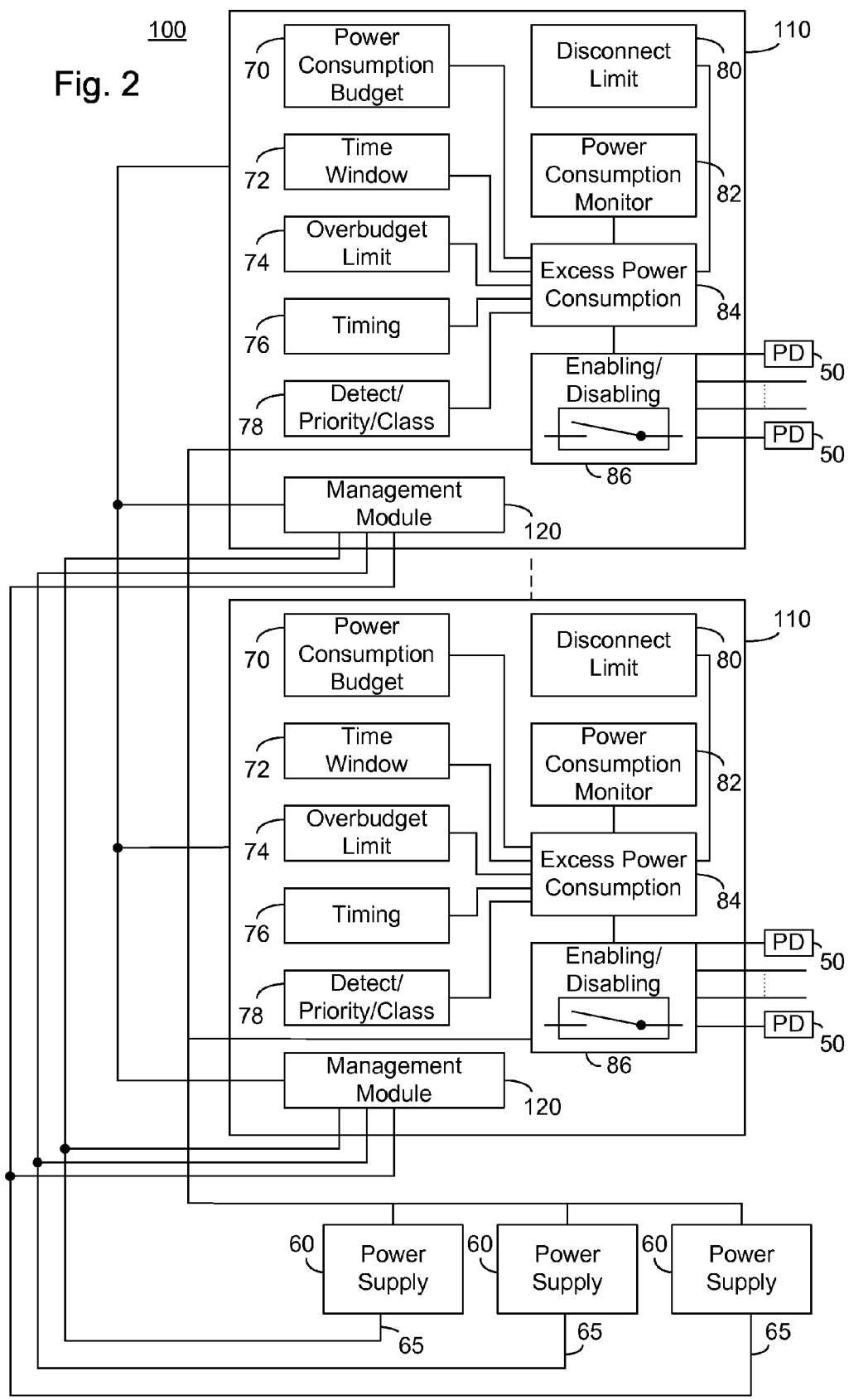
FIG. 2 is a high level schematic diagram of a power control system comprising a plurality of power controllers, each illustrated as a power over Ethernet controller providing power to a plurality of powered devices over communication cabling, the power controllers being responsive to a management module collocated within one of the power controllers.

FIG. 2 is a high level schematic diagram of a power control system 100 comprising a plurality of power controllers, each illustrated as a power over Ethernet controller 110 providing power to a plurality of powered devices 50 over communication cabling, the power controllers being responsive to a management module 120 collocated within one of the power controllers. In one embodiment, each of the power over Ethernet controllers 110 is supplied with a management module 120, and only one of the management modules 120 acts as a master performing the functions described above in relation to management module 30 of FIG. 1. In another embodiment only one of the power over Ethernet controllers 110 is supplied with management module 120.

Power control system 100 is in all other respects identical with power control system 10 described above in relation to FIG. 1, and in the interest of brevity is not described further.

Figure 3:
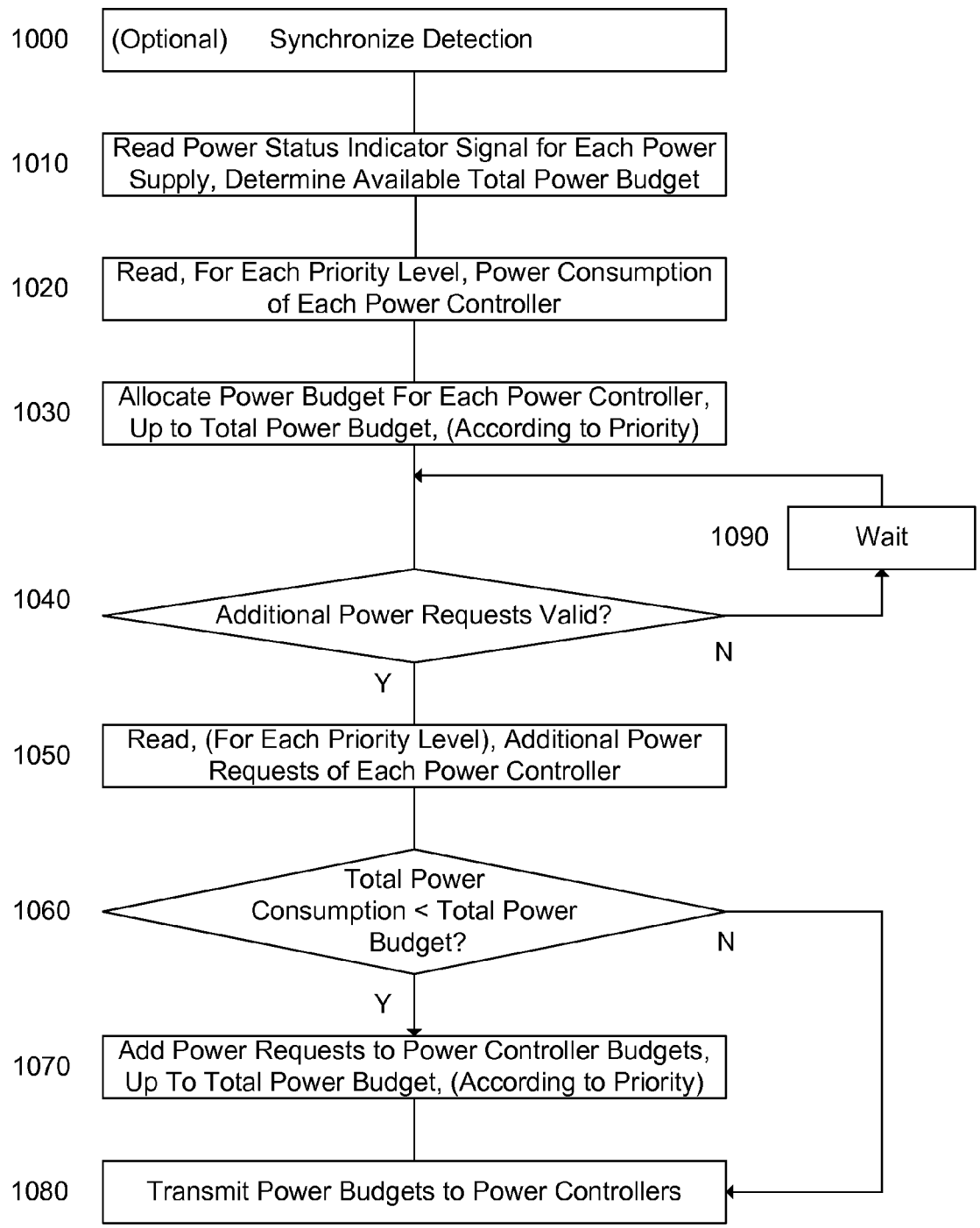
FIG. 3 illustrates a high level flow chart of the operation of the management module of FIGS. 1, 2 to allocate power to the power controllers.

FIG. 3 illustrates a high level flow chart of the operation of management module 30 of FIG. 1 or management module 120 of FIG. 2 to allocate power to the power controllers, illustrated as power over Ethernet controllers 20 and 110, respectively. In stage 1000, detection performed by each of the detection, classification and priority determining functionalities 78 is optionally synchronized, to ensure synchronous operation of power control. In stage 1010, status indicator signals 65 are read for each power supply 60, and a total power budget is determined responsive to the status indicator signals. In one embodiment, management module 30, 120 is provided with a pre-defined power availability from each of the power supplies 60. In one embodiment a reserve of power is deducted to account for power usage by management module 30, 120 and/or power over Ethernet controllers 20, 110.

In stage 1020, the power consumption of each power controller, e.g each power over Ethernet controller 20, 110, for each priority level, is read. In stage 1030, a power budget is allocated for each power controller, e.g each power over Ethernet controller 20, 110, preferably in accordance with priority communicated from detection, classification and priority determining functionalities 78, up to the total power budget of stage 1010. In stage 1040, timing from the optional detection synchronization of stage 1000 is checked, to determine if additional power requests are valid, i.e. has sufficient time passed from the optional synchronization of stage 1000 for detection, classification and priority determining functionalities 78 to have performed a detection, classification and priority determination. In the event that detection, being performed by detection, classification and priority determining functionalities 78 responsive to the optional synchronization of stage 1000 is valid, in stage 1050 each of the detection, classification and priority determining functionalities 78 is read in turn to determine additional power requests, preferably with associated priorities.

In stage 1060, total power consumption of the power controllers is determined and compared with the total power budget of stage 1010. In one embodiment total power consumption of the power controller is determined by reading each of the respective power consumption monitoring functionalities 82. In another embodiment, total power drawn from each of the power supplies is read by management module 30, 120.

In the event that in stage 1060 the total power consumption is less than the total power budget of stage 1010, in stage 1070 additional power requested by the power controllers of stage 1050 is added to each of the power controller budgets of stage 1030, up to the total power budget of stage 1010, preferably while maintaining priority. In stage 1080, the power budget for the power controllers are transmitted to each of the power controllers, e.g. power over Ethernet controllers 20, 110.

In the event that in stage 1060 the total power consumption is not less than the total power budget of stage 1010, stage 1080 as described above is performed with the power budgets of stage 1030.

In the event that in stage 1040 detection, being performed by detection, classification and priority determining functionalities 78 responsive to the optional synchronization of stage 1000 is not valid, in stage 1090 a wait state is performed, and stage 1040 is repeated.

Thus the method of FIG. 3 determines power budgets for each of the power controllers in the system, preferably while maintaining priority, and allocates up to 100% of the available power.

Figure 4:
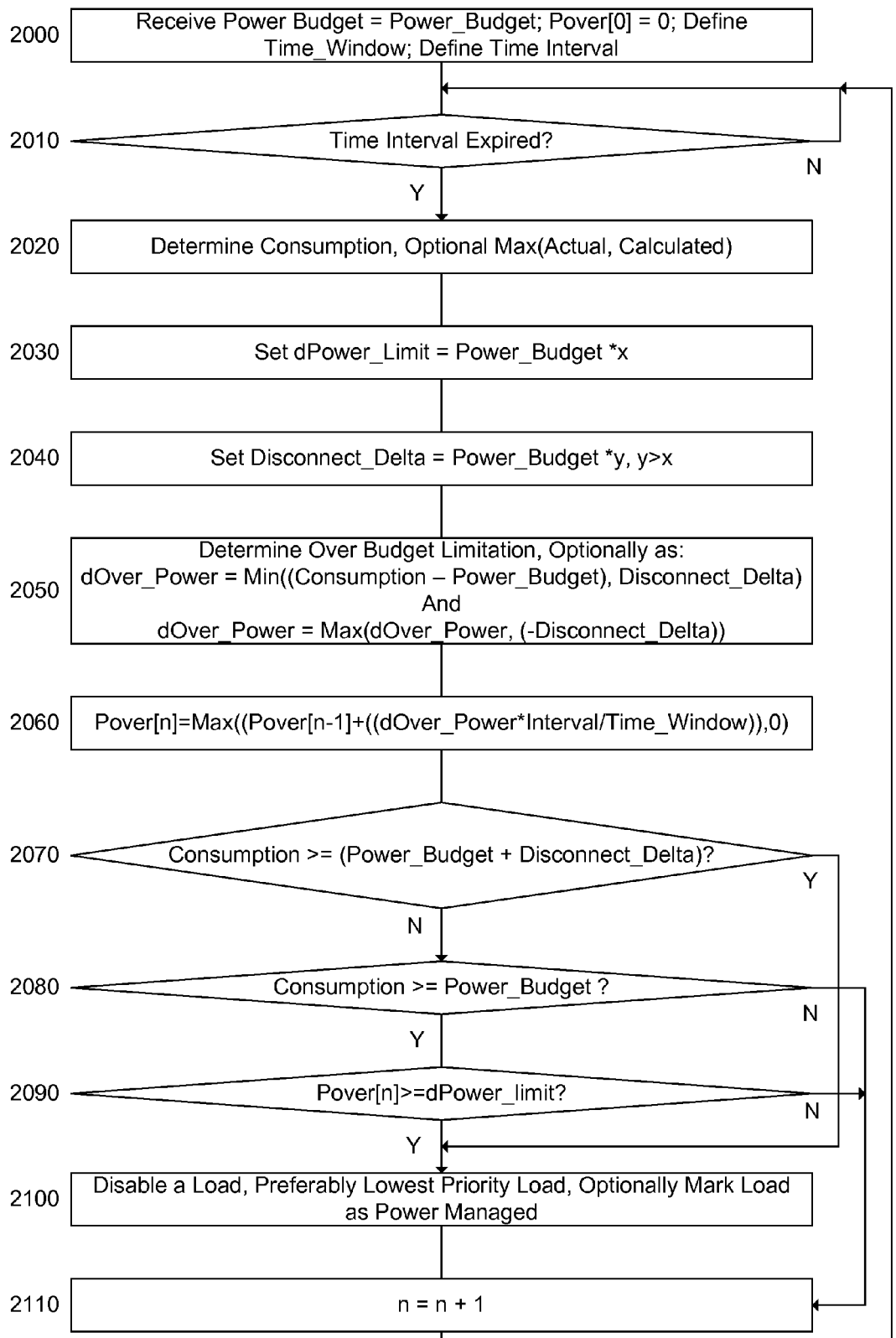
FIG. 4 illustrates a high level flow chart of the automated method of the power controllers of FIGS. 1, 2 to determine excess power consumption, and disable at least one load responsive to the determined excess power consumption.

FIG. 4 illustrates a high level flow chart of the automated method of power controllers 20, 110 of FIGS. 1, 2 to determine excess power consumption and disable at least one load, illustrated as a powered device 50, responsive to the determined excess power consumption. In stage 2000, the power budget for the respective power controller is received, and denoted Power_budget. A variable Pover is defined, and initially set to zero. Pover will represent the integral over time of excess power consumption, as will be described further below. A time window, denoted Time_Window is further defined, and the length of the time interval to be described further in relation to stage 2010, below, is defined.

In stage 2010, a timer output of timing functionality 76 is checked to determine that the routine is run periodically, i.e in accordance with the defined time interval of stage 2000. In the event that the timer has not expired, stage 2010 is repeated. Stage 2010 may also be implemented as an interrupt. In one non-limiting embodiment, the time interval of stage 2010 is set to about 17 milliseconds.

In stage 2020, total consumption of the loads, illustrated as powered devices 50 is determined, preferably responsive to power consumption monitoring functionality 82. Optionally, power consumption monitoring functionality 82 is further supplied with an actual total power consumption indication, preferably by a sense resistor serially in line with the power input to the power controller, and a maximum of the reading of the overall power indication and the sum of the power consumption of the loads is taken as the total power consumption.

In stage 2030, an overbudget limit is defined, denoted dPower_limit. In one embodiment, management module 30, 110 transmits an overbudget percentage allowed, denoted x, and the overbudget limit dPower_limit is defined responsive to the received percentage x, and the received Power_budget. In another embodiment, an overbudget percentage is pre-defined within power over Ethernet controller 20, 110 and the overbudget limit dPower_limit is defined responsive to the pre-defined overbudget percentage x, and the received Power_budget. In yet another embodiment, the overbudget amount dPower_limit is defined by management module 30, 110 and transmitted to power over Ethernet controller 20, 110. dPower_limit has been defined above as a delta over the Power_budget, however this is not meant to be limiting in any way, and in another embodiment an actual power limit is used as the overbudget limit.

In stage 2040, a disconnect power limit is defined, greater than dPower_limit of stage 2030, and denoted Disconnect_delta. In one embodiment, management module 30, 110 transmits a disconnect percentage allowed, denoted y, and the disconnect power limit Disconnect_delta is defined responsive to the received percentage y, and the received Power_budget. In another embodiment, a disconnect percentage is pre-defined within power over Ethernet controller 20, 110 and the disconnect power limit Disconnect_delta is defined responsive to the pre-defined disconnect percentage y, and the received Power_budget. In yet another embodiment, the disconnect power limit Disconnect_delta is defined by management module 30, 110 and transmitted to power over Ethernet controller 20, 110. Disconnect_delta has been defined above as a delta over the Power_budget, however this is not meant to be limiting in any way, and in another embodiment an actual disconnect power limit is used as the disconnect limit.

In stage 2050, the function of the power consumption to be used to determine an over budget event is determined and calculated. In one embodiment, as illustrated, a variable dOver_Power is defined as:

$$d\text{Over\_Power} = \text{Min}((\text{Consumption} - \text{Power\_Budget}), \text{Disconnect\_Delta}) \quad \text{Eq. 1}$$

i.e. the amount of excess consumption, i.e. consumption in accordance with stage 2020 less Power_budget of stage 2000, to be used in calculating the integral over time of excess power is limited to the disconnect limit. Such a limit takes into account that power usage in excess of Disconnect_Delta will result in immediate disconnect of a load, as will be described below in relation to stage 2070. Thus, if the components of the integral are not limited, in the event of consumption well in excess of Power_budget, the integral will spike to a large over limit and disconnect additional ports. Additionally, $$d\text{Over\_Power} = \text{Max}(d\text{Over\_Power}, (-\text{Disconnect\_Delta})) \quad \text{Eq. 2}$$

i.e. the amount of under consumption during a period is limited to the disconnect limit. This is to prevent a single reading of very low consumption from compensating for a large period of maximal consumption. Stage 2050 thus limits the values of excess power consumption for each reading to be within a predefined range.

In stage 2060, the limited values of stage 2050 are integrated over the time window of stage 2000. In particular, the indication of excess power consumption, limited as in stage 2050, is integrated over Time_Window. In one particular embodiment, the integration is performed in a piecewise linear fashion as:

$$\text{Pover}[n] = \text{Max}((\text{Pover}[n-1] + ((d\text{Over\_power} * \text{Interval} / \text{Time\_Window})), 0) \quad \text{Eq. 3}$$

in which Interval is defined as the time interval of stage 2010, and dOver_power is the result of Eq. 1 and Eq. 2 above. Thus, the amount of excess consumption, controlled as to range, is multiplied by the percentage of time of the current interval in relation to the overall time window and accumulated in Pover. Pover is preferably not permitted to go below zero in any period, since if Pover is less than zero, there is no excess power consumption. Particularly, limiting Pover to non-negative values prevents a historical underusage from being included in the integral Pover.

In stage 2070 total power consumption of stage 2020 is compared with the sum of the disconnect power limit, Disconnect_delta, and the power budget, Power_budget. In the event that consumption has not exceeded or equaled the sum of the disconnect power limit Disconnect_delta and the power budget, Power_budget, in stage 2080 total power consumption of stage 2020 is compared with the total power budget, Power_budget. In the event that total power consumption of stage 2020 is greater than, or equal to, Power_budget, in stage 2090 the integrated value Pover of Eq. 3 is compared with the overbudget limit, dPower_limit, of stage 2030. In the event that Pover is greater than, or equal to, dPower_limit, i.e. the integral of the excess power consumption is greater than the overbudget limit, in stage 2100 a load is disabled, preferably maintaining priority. In an embodiment in which loads are represented by powered devices 50, a single powered device 50 is disabled, preferably via power enabling/disabling functionality 86. Optionally, a flag is set indicating that the load has been disabled due to overall excess power consumption, and thus until additional power is available the load can not be powered.

In stage 2110, an index is advanced, and stage 2010, described above is performed. In the event that in stage 2070 consumption has exceeded or equaled the sum of the disconnect power limit, Disconnect_delta, and the power budget, Power_budget, stage 2100 as described above is performed to immediately reduce power consumption.

In the event that in stage 2080 total power consumption of stage 2020 is less than Power_budget, i.e. currently there is no excess consumption, stage 2110 as described above is performed without requiring any load to be disabled. Stage 2080 thus allows for a disconnection, such as a previous occurrence of stage 2100, which has succeeded in reducing total power consumption to be less than Power_budget, to be accrued to the integral Pover, without allowing Pover, which requires a plurality of cycles to more fully reflect the reduced load, to disconnect additional loads.

In the event that in stage 2090 Pover is less than dPower_limit, i.e. the integral of the excess power consumption is less than the overbudget limit, stage 2110 as described above is performed with requiring any load to be disabled.

Thus, the method of FIG. 4 determines at a plurality of time intervals of stage 2010, an indication of excess power consumption. The indication of excess power consumption is a function of the power consumption and the power budget for the power controller. An integral over a time window of a function of the indication of excess power consumption is compared with an overbudget limit, and at least one load is disabled in the event that the integral exceeds the overbudget limit.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable subcombination.

Unless otherwise defined, all technical and scientific terms used herein have the same meanings as are commonly understood by one of ordinary skill in the art to which this invention belongs. Although methods similar or equivalent to those described herein can be used in the practice or testing of the present invention, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present invention is not limited to what has been particularly shown and described hereinabove. Rather the scope of the present invention is defined by the appended claims and includes both combinations and subcombinations of the various features described hereinabove as well as variations and modifications thereof which would occur to persons skilled in the art upon reading the foregoing description and which are not in the prior art.

We claim:

1. An automated method of controlling a power managed system, the method comprising:
   establishing a power consumption budget for a plurality of loads each consuming power;
   defining an overbudget limit and an associated time window;
   defining a disconnect limit, said disconnect limit greater than said defined overbudget limit;
   monitoring power consumption of said plurality of loads;
   in the event that said monitored power consumption exceeds said defined disconnect limit, disabling at least one of the plurality of loads from consuming power;
   determining, at a plurality of time intervals over said associated time window, an indication of excess power consumption for each of said plurality of time intervals, said indication of excess power consumption being a function of said monitored power consumption and said defined power consumption budget; and
   in the event that an integral over said associated time window of a function of said determined indications of excess power consumption exceeds said overbudget limit, disabling at least one of the plurality of loads from consuming power.

2. An automated method according to claim 1, wherein said function of said determined indications comprises limiting values of said determined indications of excess power consumption to a predetermined range.

3. An automated method according to claim 1, wherein said predetermined range is a function of said disconnect limit.

4. A power controller arranged to supply power to a plurality of loads, said power controller comprising:
   a power consumption budget storage functionality, arranged to store a power consumption budget for the plurality of loads for which power is enabled;
   a time window storage functionality, arranged to store a time window;
   an overbudget limit defining functionality, arranged to define an overbudget limit;
   a disconnect limit defining functionality, arranged to define a disconnect limit greater than said overbudget limit;
   a power consumption monitoring functionality arranged to monitor a total power consumption of the plurality of loads;
   an excess power consumption determining functionality, in communication with said power consumption budget storage functionality, said power consumption monitoring functionality and said time window storage functionality, said excess power consumption determining functionality arranged to determine at a plurality of time intervals over said associated time window of said time window storage functionality an indication of excess power consumption of the plurality of loads for which power is enabled for each of said plurality of time intervals, said indication of excess power consumption determined as a function of said monitored power consumption and said defined power consumption budget; and
   a power enabling/disabling functionality arranged to:
      disable, in the event that an integral over said associated time window of a function of said determined indications of excess power consumption exceeds said overbudget limit, at least one of the plurality of loads from consuming power; and
      disable, in the event that said determined indication of excess power consumption for any of said plurality of time intervals exceeds said disconnect limit, at least one of the plurality of loads from consuming power.

5. A power controller according to claim 4, wherein said function of said determined indications comprises a limitation of the values of said determined indications of excess power consumption to a predetermined range.

6. A power controller according to claim 4, wherein said predetermined range is a function of said disconnect limit.

7. A power controller according to claim 4, wherein at least one of said plurality of loads is a powered device receiving power over Ethernet from the power controller.

8. A power control system arranged to supply power to a plurality of loads, said power control system comprising:
   a management module; and
   a plurality of power controllers in communication with said management module,
   said management module arranged to transmit to each of said power controllers a power consumption budget;
   each of said plurality of power controllers arranged to supply power to a plurality of connected loads, and further arranged to:
   define an overbudget limit and an associated time window;
   define a disconnect limit, said disconnect limit greater than said overbudget limit;
   monitor power consumption of said plurality of loads;
   determine, at a plurality of time intervals over said associated time window, an indication of excess power consumption for each of said plurality of time intervals, said indication of excess power consumption being a function of said monitored power consumption and said defined power consumption budget;
   in the event that said determined indication of excess power consumption for any of said plurality of time intervals exceeds said disconnect limit, disable at least one load from consuming power; and
   in the event that an integral over said associated time window of a function of said determined indications of excess power consumption exceeds said overbudget limit, disable at least one load from consuming power.

9. A power control system according to claim 8, wherein said function of said determined indications comprises a limitation of values of said determined indications of excess power consumption to a predetermined range.

10. A power control system according to claim 8, wherein said predetermined range is a function of said disconnect limit.

11. A power control system according to claim 8, wherein said overbudget limit and said associated time window are received from said management module.

12. A power control system according to claim 8, wherein at least one of said plurality of loads is a powered device receiving power over Ethernet from one of said power controllers.

* * * * *